US012454839B2

(12) United States Patent
Ferebee

(10) Patent No.: US 12,454,839 B2
(45) Date of Patent: Oct. 28, 2025

(54) PORTABLE BATHTUB STEPSTOOL AND METHODS OF MAKING AND USING THE SAME

(71) Applicant: Katherine M. Ferebee, Mocksville, NC (US)

(72) Inventor: Katherine M. Ferebee, Mocksville, NC (US)

( * ) Notice: Subject to any disclaimer, the term of this patent is extended or adjusted under 35 U.S.C. 154(b) by 1051 days.

(21) Appl. No.: 17/329,381

(22) Filed: May 25, 2021

(65) Prior Publication Data

US 2022/0381089 A1 Dec. 1, 2022

(51) Int. Cl.
*E04H 4/14* (2006.01)
*E06C 1/14* (2006.01)

(52) U.S. Cl.
CPC ............... *E04H 4/144* (2013.01); *E06C 1/14* (2013.01)

(58) Field of Classification Search
CPC ... A47C 12/02; E06C 1/14; E06C 1/18; E06C 1/32; E04H 4/144
See application file for complete search history.

(56) References Cited

U.S. PATENT DOCUMENTS 81,279 A * 8/1868 Knowles .................. E06C 1/32 182/24
130,549 A * 8/1872 Valley ...................... E06C 1/32 182/24
190,027 A * 4/1877 Goffette ................. A47C 12/02 182/33.2
353,316 A * 11/1886 Levanseler ............ A47C 12/02 182/33.2
371,128 A * 10/1887 Dudley .................. A47C 12/02 182/33.2
579,437 A * 3/1897 Knisell ..................... E06C 1/39 182/27
958,732 A * 5/1910 Dennis ...................... E06C 1/20 182/162
2,998,862 A * 9/1961 Earley .................... A47C 12/02 182/33.2
3,288,248 A * 11/1966 Gurian ...................... E06C 1/24 182/106
3,554,318 A * 1/1971 Knight ...................... E06C 1/32 182/27
3,586,124 A * 6/1971 Kunzweiler ............ E04H 4/144 182/129
3,960,241 A * 6/1976 Arias ..................... A47C 12/02 297/118

(Continued)

FOREIGN PATENT DOCUMENTS

GB 2110286 A * 6/1983 ............. E06C 1/125
WO WO-2010102022 A1 * 9/2010 ............... B25H 1/06

*Primary Examiner* — Colleen M Chavchavadze
(74) *Attorney, Agent, or Firm* — Ashley D. Dagwows; Dogwood Patent and Trademark Law

(57) ABSTRACT

The invention is a device that allows a user to enter and exit a bathtub or other apparatus with a relatively high sidewall safely and easily. Particularly, the device comprises first and second sides that can be positioned on either surface of a bathtub sidewall. The first and second sides each include one or more braces that support a plurality of steps that enable a user to climb up one side of the device and down the other. The device can include one or more stabilizers that are sized and shaped to allow a user to securely grab onto as they advance up or down the steps, thereby maintaining balance.

9 Claims, 11 Drawing Sheets

(56) References Cited

U.S. PATENT DOCUMENTS

| | | | | | |
|---|---|---|---|---|---|
| 3,991,851 | A * | 11/1976 | Gannon | E06C 7/081 | 182/86 |
| 4,082,162 | A * | 4/1978 | Diez | E06C 1/32 | 182/178.4 |
| 4,244,444 | A * | 1/1981 | Quaggiotto | E06C 1/18 | 182/104 |
| 4,483,415 | A * | 11/1984 | Disston | E06C 1/22 | 182/156 |
| 4,524,847 | A * | 6/1985 | Mintz | E06C 1/32 | 182/23 |
| 4,560,030 | A * | 12/1985 | Mucelli | E06C 1/393 | 182/160 |
| 4,834,216 | A * | 5/1989 | Wallick, Jr. | E06C 7/08 | 182/180.1 |
| 4,989,692 | A * | 2/1991 | Min | E06C 1/39 | 182/24 |
| 5,158,151 | A * | 10/1992 | Chang | E06C 1/18 | 182/159 |
| 5,170,862 | A * | 12/1992 | Chang | E06C 1/3835 | 182/159 |
| 5,228,535 | A * | 7/1993 | McCarty | E06C 1/52 | 182/163 |
| 5,353,892 | A * | 10/1994 | Lu | E06C 1/39 | 182/27 |
| 5,357,876 | A * | 10/1994 | Kniefel | E04H 3/12 | 108/92 |
| 6,427,804 | B1 * | 8/2002 | Lazarus | E06C 1/39 | 182/153 |
| 6,857,503 | B2 * | 2/2005 | Simpson | E06C 1/18 | 182/178.3 |
| 7,264,082 | B2 * | 9/2007 | Simpson | E06C 1/32 | 182/163 |
| 7,690,316 | B2 * | 4/2010 | Yoo | E04G 1/34 | 108/115 |
| 9,074,384 | B2 * | 7/2015 | Lin | E04H 4/144 | |
| 9,309,718 | B1 * | 4/2016 | Matthew | E06C 1/16 | |
| 9,926,743 | B1 * | 3/2018 | Eatmon | E06C 1/39 | |
| 9,968,226 | B1 * | 5/2018 | Anderson | A47K 3/38 | |
| 11,492,847 | B2 * | 11/2022 | Yoo | E06C 1/393 | |
| 2004/0129497 | A1 * | 7/2004 | Weiss | E06C 1/39 | 182/163 |
| 2015/0027810 | A1 * | 1/2015 | Yoo | E06C 1/393 | 182/27 |
| 2015/0047927 | A1 * | 2/2015 | Nodarse | E06C 7/06 | 182/209 |
| 2015/0090531 | A1 * | 4/2015 | Yang | E06C 7/46 | 182/104 |
| 2019/0136625 | A1 * | 5/2019 | Chen | E06C 1/18 | |
| 2019/0301243 | A1 * | 10/2019 | Huang | E04H 4/144 | |
| 2020/0141184 | A1 * | 5/2020 | Liu | E06C 1/383 | |
| 2020/0386050 | A1 * | 12/2020 | Mittanck | E06C 1/383 | |
| 2020/0391372 | A1 * | 12/2020 | Strempke | B25H 3/006 | |
| 2022/0098928 | A1 * | 3/2022 | Zaifman | A47C 12/02 | |
| 2022/0195800 | A1 * | 6/2022 | Foley | E06C 1/20 | |

* cited by examiner

PORTABLE BATHTUB STEPSTOOL AND METHODS OF MAKING AND USING THE SAME

TECHNICAL FIELD

The presently disclosed subject matter is generally directed to a portable and pivotable stepstool that can be used in a variety of environments, such as a bathtub.

BACKGROUND

Traditional bathtubs have high sidewalls that allow the bathtub to hold a large volume of water. However, many individuals have difficulty accessing the bathtub due to the high step required to enter and exit the bathtub. Specifically, the elderly and those suffering from arthritis, debilitating injuries, handicaps, and/or general loss of mobility may be unable to enter or exit a bathtub without pain or difficulty. For these individuals, the sidewall of a bathtub can be an insurmountable hurdle. Even with the assistance of a nurse or health aide, many people are not capable of safely stepping over the sidewall of a bathtub to take a bath or shower. As a result, people that have physical limitations may choose to forego taking a bath or shower altogether and settle for alternate bathing methods, such as sponge baths and the like. However, the alternate bathing methods are significantly less effective and can prove uncomfortable or embarrassing. It would therefore be beneficial to provide a device that allows a wide variety of users to enter and exit a bathtub easily and safely.

SUMMARY

In some embodiments, the presently disclosed subject matter is directed to a stepping device. Particularly, the device comprises a first side and a second side, operably connected together via a rotatable element, wherein each side is defined by at least one brace operably connected to a plurality of steps including a top step at a maximum height of the device. The first side is pivotable relative to the second side, such that the top step of the first side is positioned directly adjacent to the top step of the second side.

In some embodiments, the first side is configured to be positioned above the second side in the pivoted orientation.

In some embodiments, the device further comprises a stabilizer attached to at least one brace.

In some embodiments, the rotatable element is selected from a hinge, pivot pin, or combinations thereof.

In some embodiments, each brace includes a non-skid foot positioned adjacent to a support surface.

In some embodiments, the length of each brace is adjustable.

In some embodiments, each side of the device comprises about 1-5 steps.

In some embodiments, the device has a total height (e.g., longest vertical distance) of about 12-50 inches.

In some embodiments, the top step of the first and second sides each have a top face and an opposed bottom face, wherein the top faces of the top steps are facing each other in the pivoted orientation.

In some embodiments, the presently disclosed subject matter is directed to a method of entering an apparatus comprising an interior and at least one sidewall. Particularly, the method comprises positioning a stepping device to straddle the sidewall, wherein the device first side is housed within the interior of the apparatus and the second side is housed external to the apparatus. The device comprises a first side and a second side, operably connected together via a rotatable element, wherein each side is defined by at least one brace operably connected to a plurality of steps including a top step at a maximum height of the device. The first side is pivotable relative to the second side, such that the top step of the first side is positioned directly adjacent to the top step of the second side. The method includes ascending up the steps of the second side and descending down the steps of the first side such that the user enters the interior of the apparatus. The method further includes pivoting the first side from the interior of the apparatus via the rotatable element, such that the top step of the first side and the top step of the second side are directly adjacent to each other.

In some embodiments, the apparatus is a bathtub.

In some embodiments, the method includes gripping a stabilizer attached to at least one brace during the ascending step, descending step, or both.

DETAILED DESCRIPTION

Figure 1A:
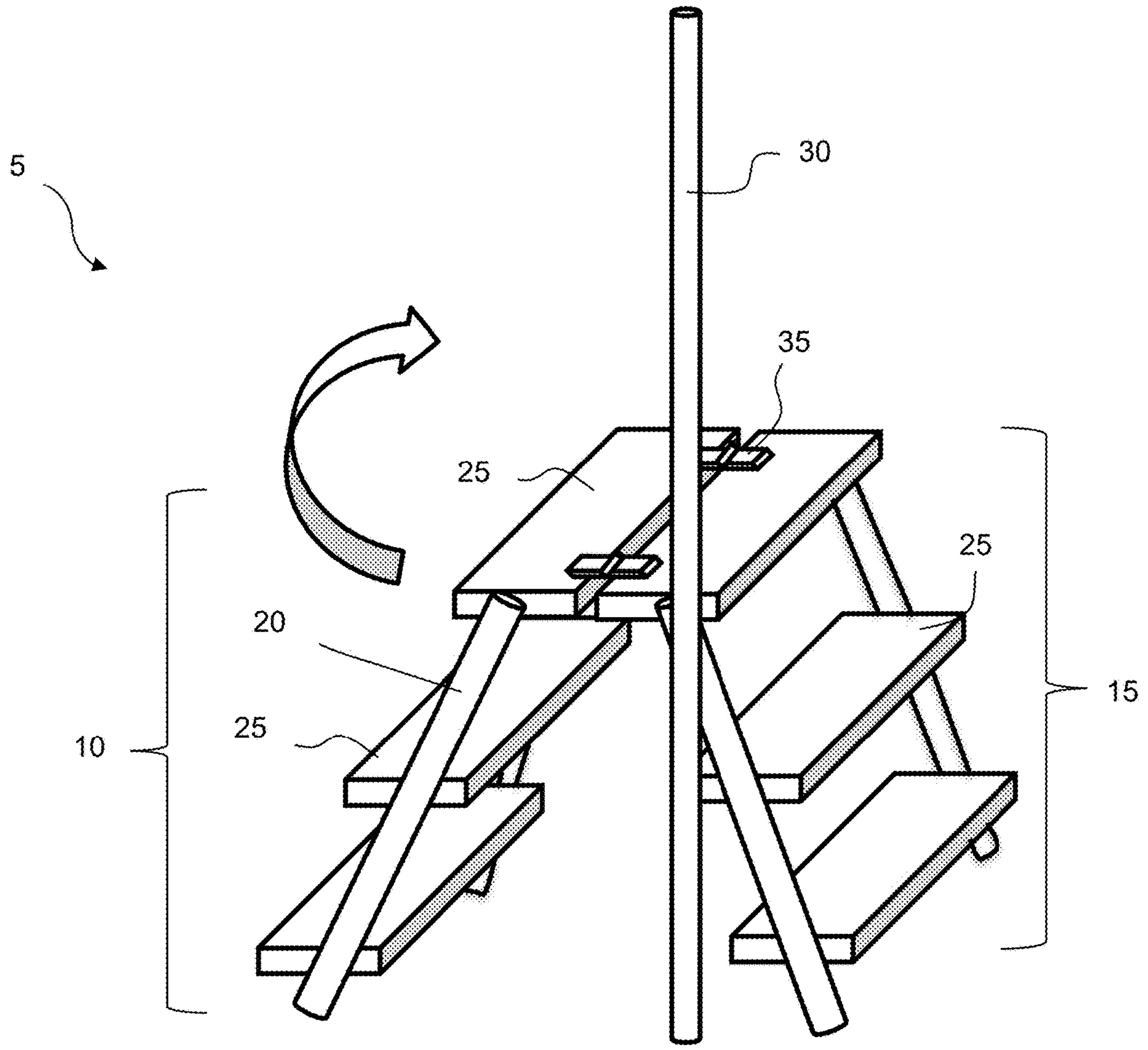
FIG. 1*a* is a perspective view of a portable stepping device in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1B:
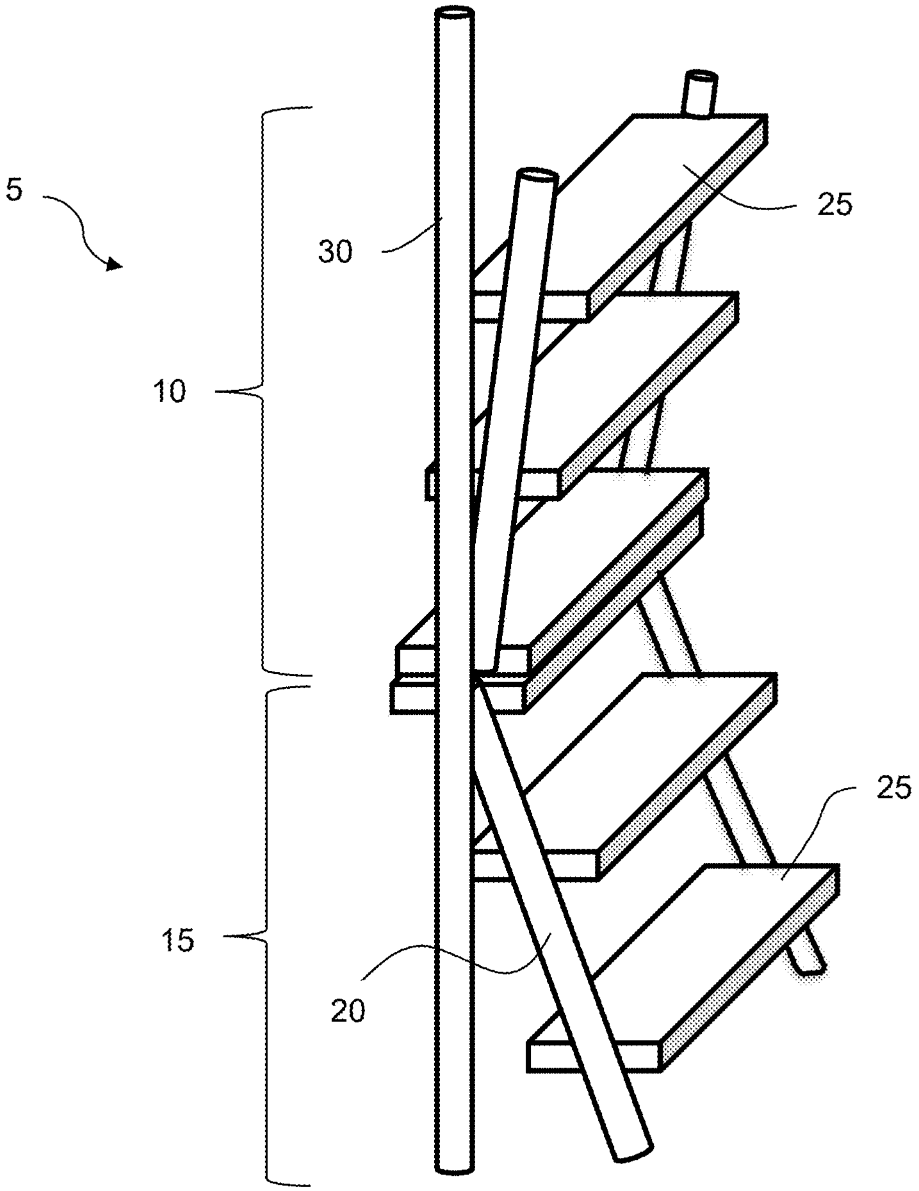
FIG. 1*b* is a perspective view of the device of FIG. 1*a* in a pivoted orientation in accordance with some embodiments of the presently disclosed subject matter.

The presently disclosed subject matter is generally directed to a device that allows a user to enter and exit a bathtub or other apparatus with a relatively high sidewall safely and easily. Particularly, FIGS. 1*a* and 1*b* illustrate one embodiment of device 5 comprising first and second sides 10, 15 that can be positioned on either surface of a bathtub sidewall. Sides 10, 15 each include one or more braces 20 that support a plurality of steps 25 that enable a user to climb up one side of the device and down the other. In some embodiments, the device can include one or more stabilizers 30 that are sized and shaped to allow a user to securely grab onto as they advance up or down the steps, thereby maintaining balance. Advantageously, first side 10 can be rotated up and above second side 15 using hinges 35 or any other rotatable element, as illustrated in FIG. 1*b*. In this way, the first side can be removed and added to the interior of a bathtub on demand, as described in more detail herein below.

Figure 2:
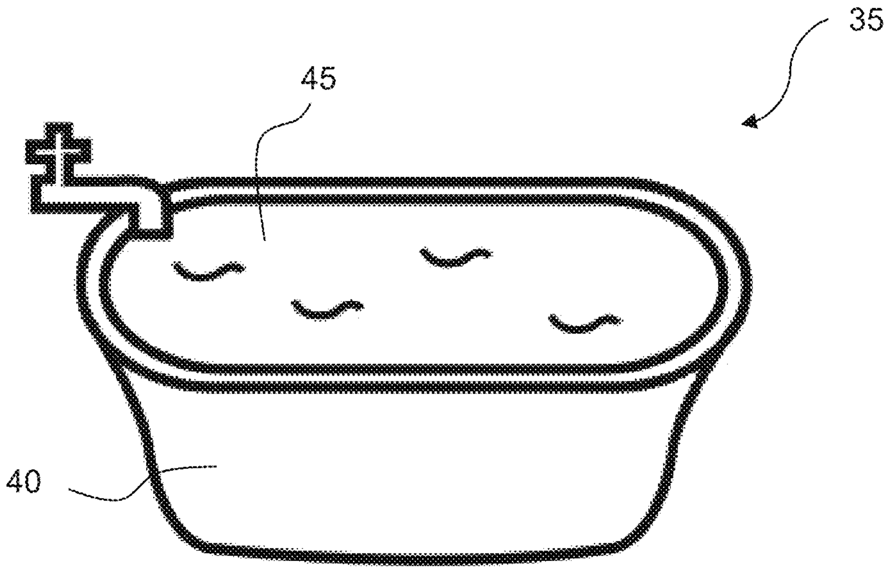
FIG. 2 is a perspective view of a conventional bathtub in accordance with some embodiments of the presently disclosed subject matter.

As described, the disclosed device can be easily used with a conventional bathtub. One example of bathtub 35 defined by a series of sidewalls 40 that define interior 45 is illustrated in FIG. 2. However, it should be appreciated that bathtub 35 is not limited and can include any of a wide variety of models and designs.

Figure 3A:
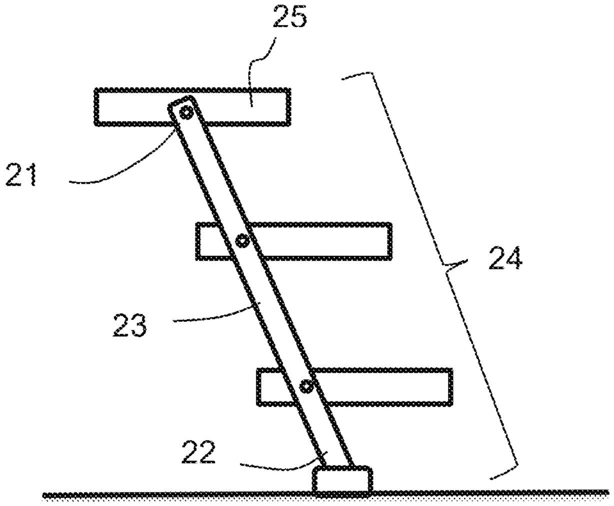
FIG. 3*a* is a side plan view of a device brace in accordance with some embodiments of the presently disclosed subject matter.
Figure 3B:
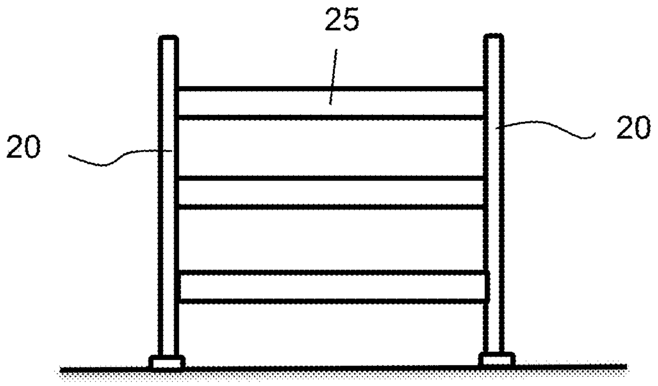
FIG. 3*b* is a front plan view of a device brace in accordance with some embodiments of the presently disclosed subject matter.

As set forth above, device 5 includes first and second sides 10, 15, each including at least one brace that supports and stabilizes a series of steps 25. The term "brace" broadly refers to any support structure and is not limited to the those illustrated in the Figures. As illustrated in FIGS. 3*a* and 3*b*, braces 20 provide support for a series of steps 25. Each brace includes upper end 21, lower end 22, and body 23 therebetween. Braces 20 can have a length 24 of about 12-60 inches (e.g., at least/no more than about 12, 15, 20, 25, 30, 35, 40, 45, 50, 55, or 60 inches). The term "length" refers to the distance between upper and lower ends 21, 22. However, the presently disclosed subject matter is not limited and braces 20 can be configured shorter or longer than the range given herein.

In some embodiments, each leg can be adjustable in length using standard techniques, such as telescoping arrangements, the addition and removal of segments, and the like.

Figure 3C:
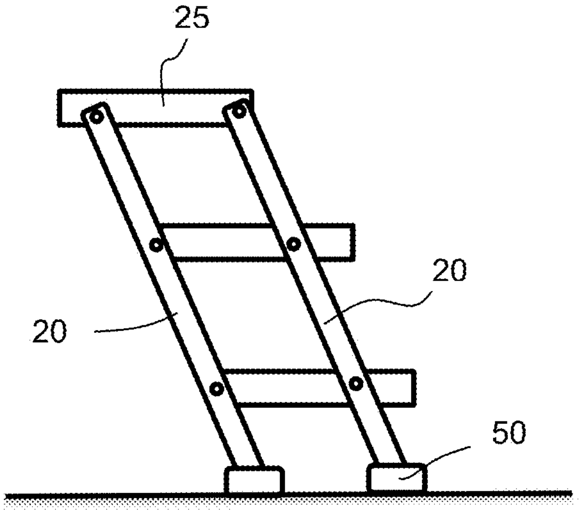
FIG. 3*c* is a side plan view of a device comprising a plurality of braces in accordance with some embodiments of the presently disclosed subject matter.

In some embodiments, a single brace is attached on either side of a corresponding step 25, as shown in FIGS. 3*a* and 3*b*. However, any number of braces can be operably connected with steps 25, as illustrated in FIG. 3*c*.

Optionally, lower end 22 of braces 20 can include foot 50 to prevent and/or reduce the likelihood of movement during use. Each foot can include a bottom surface configured to rest upon a generally flat surface, such as a bathroom floor or the inside surface of a bathtub. Thus, the bottom surface of each foot can include a non-skid surface, such as (but not limited to) plastic, rubber, textured regions, and the like.

Figure 4:
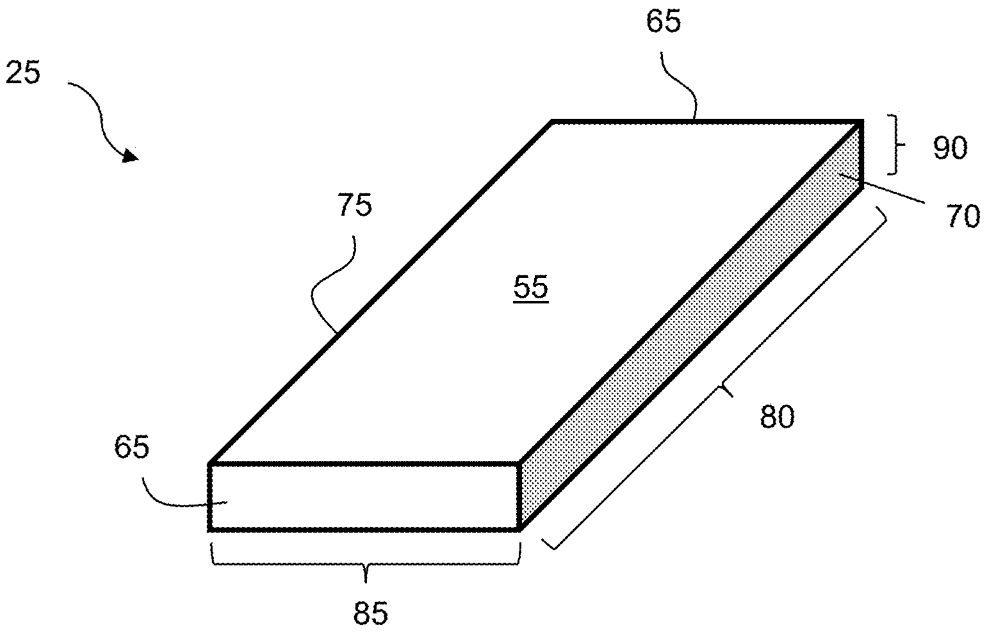
FIG. 4 is a perspective view of a device step in accordance with some embodiments of the presently disclosed subject matter.

As described above, steps 25 are attached along the length of braces 20. FIG. 4 illustrates one embodiment of step 25 comprising top face 55, opposed bottom face, a pair of side faces 65, front face 70, and rear face 75. Step 25 can have any desired length, width, and/or thickness. For example, the step can have length 80 of about 5-20 inches (at least/no more than about 5, 10, 15, or 20 inches). The term "length" refers to the longest horizontal distance between side edges 65. The step can have width 85 of about 3-10 inches (e.g., at least/no more than about 3, 4, 5, 6, 7, 8, 9 or 10 inches). The term "width" refers to the longest horizontal distance between front and rear faces 70, 75. Further, each step can have thickness 90 of about 0.25-5 inches (e.g., at least/no more than about 0.25, 0.5, 0.75, 1, 2, 3, 4, or 5 inches). The term "thickness" refers to the longest vertical distance between the top and bottom step faces. Although several ranges are given herein, it should be appreciated that step 25 can have any desired configurations and are not limited to the ranges given herein.

Similarly, although depicted as rectangular in shape in the Figures, steps 25 can have any desired shape and/or cross-sectional shape, such as (but not limited to) rectangular, square, trapezoidal, and the like. However, each step has at least one flat surface (e.g., top face 55) sized and shaped to allow a user's weight to rest thereupon.

Figure 9:
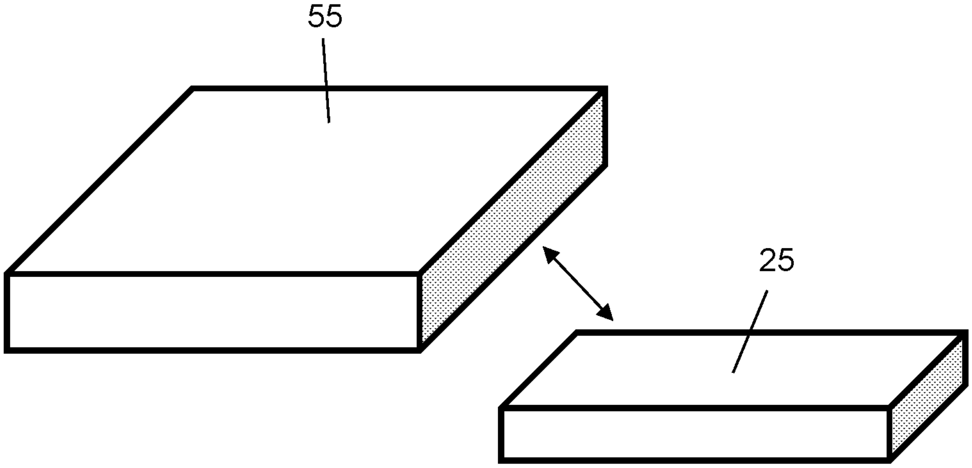
FIG. 9 is a perspective view of a top step relative to one of the remaining steps of the device in accordance with some embodiments of the presently disclosed subject matter.

In some embodiments, each step can have about the same length, width, and/or thickness. However, the presently disclosed subject matter is not limited and at least one step can differ when compared to at least one other step. For example, the top step can be constructed to be thicker or wider to provide additional support for a user at the elevated height, as illustrated in FIG. 9.

Device 5 can include any desired number of steps 25, such as about 1-5 on each side. However, the presently disclosed subject matter is not limited and the device can include greater than 5 steps in some embodiments.

Each step 25 is operably connected to one or more braces 25. Particularly, brace 20 can be attached to one or more top, bottom, side, front, or rear faces of steps 25. Any suitable method can be used to permanently or releasably attach each step to frame 20. For example, mechanical elements (e.g., screws, bolts, fasteners, clips), magnets, snap fit closure, pressure-fit closure, or combinations thereof can be used.

Figure 5A:
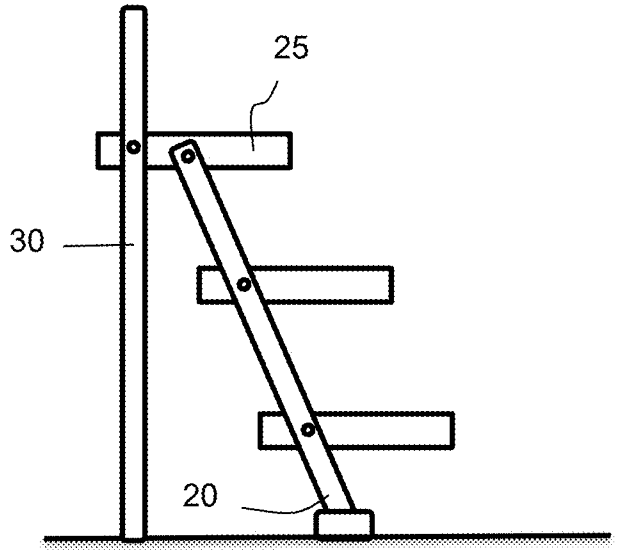
FIG. 5*a* is a side plan view of a device comprising a stabilizer in accordance with some embodiments of the presently disclosed subject matter.
Figure 5B:
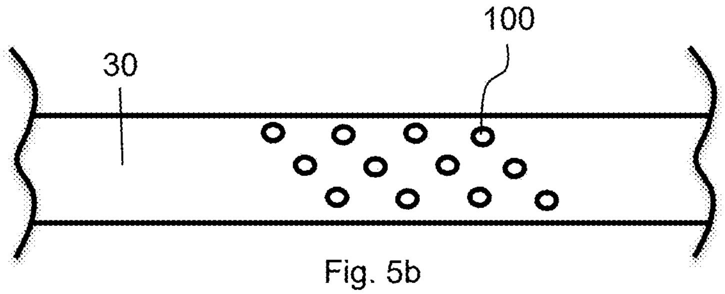
FIG. 5*b* is a fragmentary view of a stabilizer comprising a series of textured regions in accordance with some embodiments of the presently disclosed subject matter.
Figure 5C:
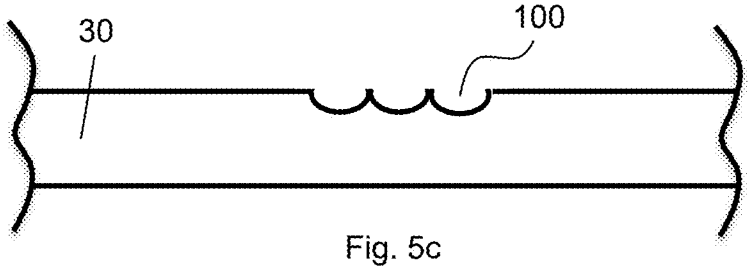
FIG. 5*c* is a fragmentary view of a stabilizer comprising a series of gripping indentations in accordance with some embodiments of the presently disclosed subject matter.

Device 5 can also optionally include one or a pair of stabilizers 30 that can be attached to braces 20. The term "stabilizer" refers to any element that assists a user in maintaining balance. One embodiment of stabilizer 30 is illustrated in FIG. 5*a*. In some embodiments, the stabilizer can be attached to brace 20 using standard techniques (e.g., bolts, screws, magnets, and the like), providing close access to the user. The stabilizer can include textured regions 100 and/or a series of grips or indentations 105 to assist the user in properly gripping the stabilizer, as shown in FIGS. 5*b* and 5*c*. Such elements allow the user to grip the device more securely, maintaining balance while ascending or descending the steps, as described below.

It should be appreciated that stabilizers 30 can be formed in any shape (e.g., round, square, rectangle), size, and the like. Further, any number of stabilizers can be included.

Brace 20, stabilizer 30, and steps 25 can be constructed from any rigid material, such as (but not limited to) metal (e.g., stainless steel, steel, aluminum, copper, and the like), wood, plastic, and combinations thereof. In some embodiments, the materials used to construct the braces and/or steps can be lightweight, strong, and water-resistant. The term "water-resistant" refers to the ability to resist the penetration of water or other liquids.

Figure 6A:
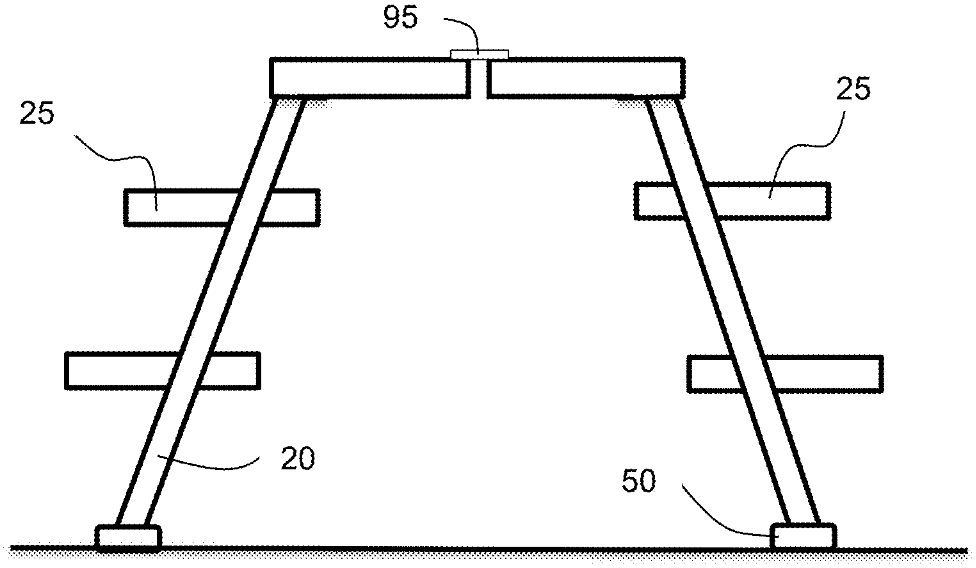
FIG. 6*a* is a side plan view of a device in an unpivoted orientation in accordance with some embodiments of the presently disclosed subject matter.
Figure 6B:
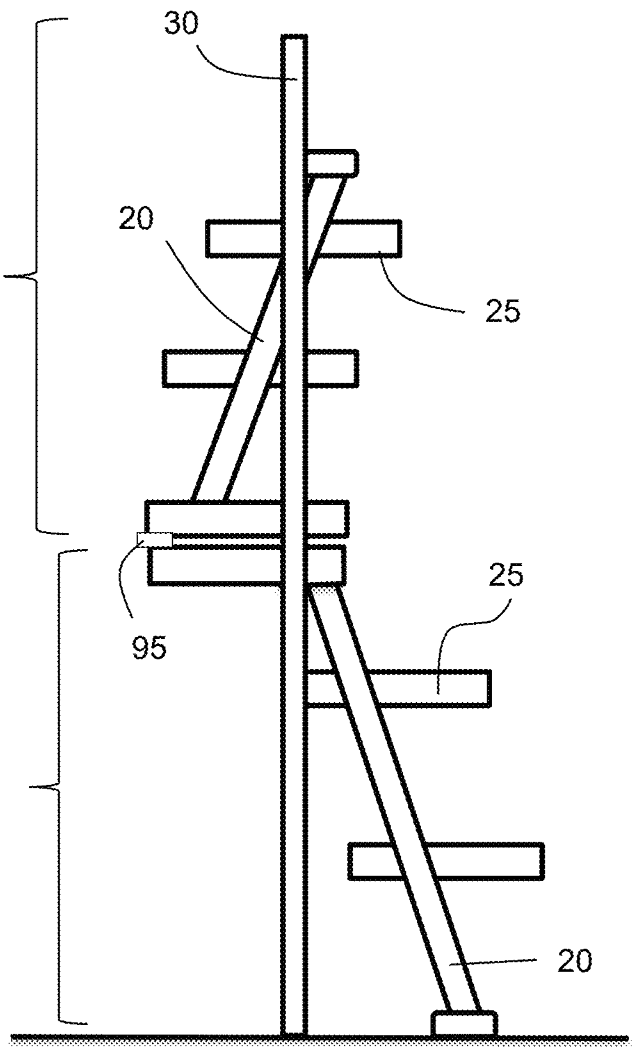
FIG. 6*b* is a side plan view of a device in a pivoted orientation in accordance with some embodiments of the presently disclosed subject matter.

As set forth above, each device includes first side 10 and second side 15 that are pivotably connected together using rotator 95. The term "rotator" refers to any element that allows the first side of the device to be rotated relative to the second side. Suitable rotators can include (but are not limited to) hinges, pivot pins, slides, flexible joints, and the like. As illustrated in FIG. 6*a*, the braces and steps form an A-shape when in the normal use position, and rotator 95 is positioned between the top steps of first and second sides 10, 15. In use, the rotator allows first end 10 to swing upward and towards second end 15, such that the front faces of each top step are facing each other, as shown in FIG. 6*b*.

Figure 7:
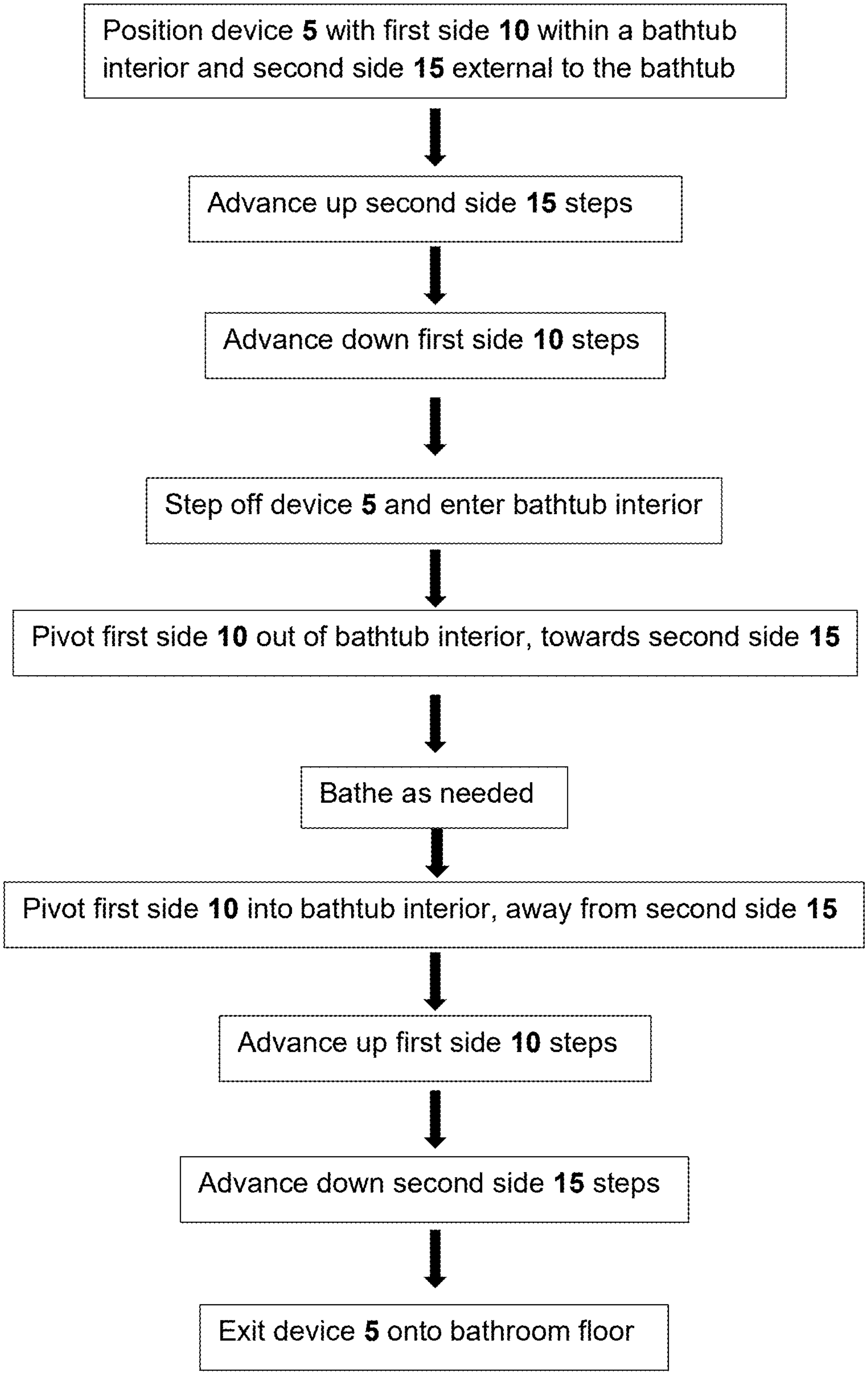
FIG. 7 is a schematic illustrating one method of using the disclosed device in accordance with some embodiments of the presently disclosed subject matter.
Figure 8A:
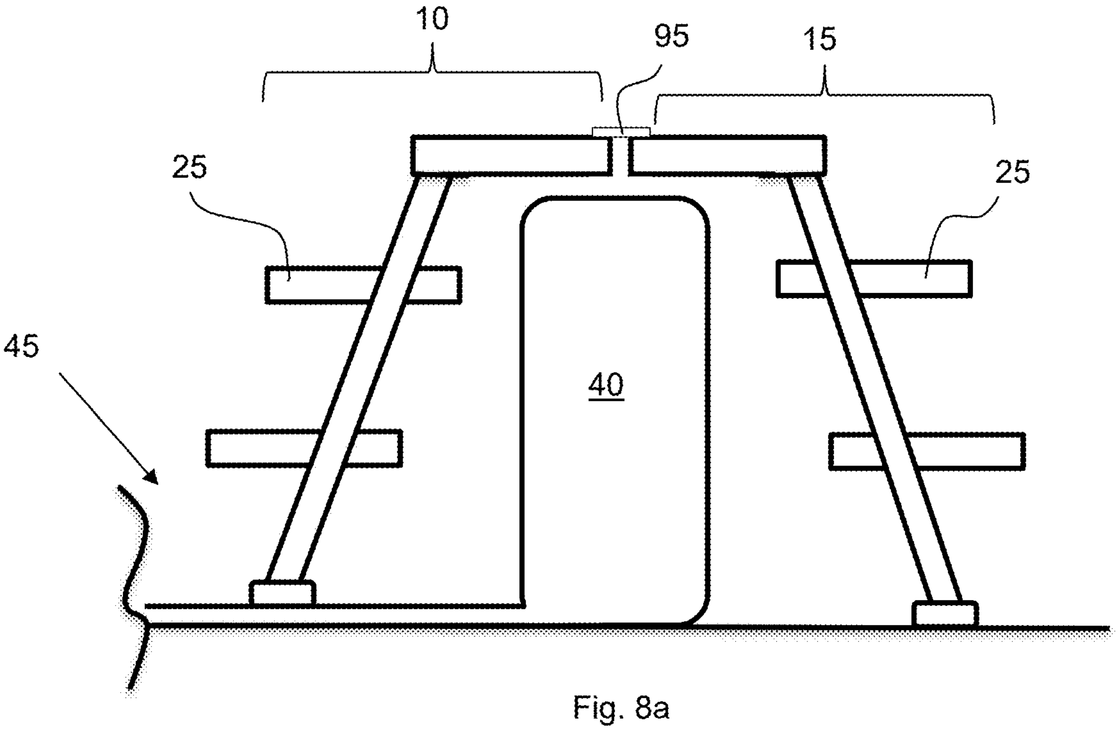
FIGS. 8*a*-8*d* are side plan views of one method of using the device in accordance with some embodiments of the presently disclosed subject matter.
Figure 8B:
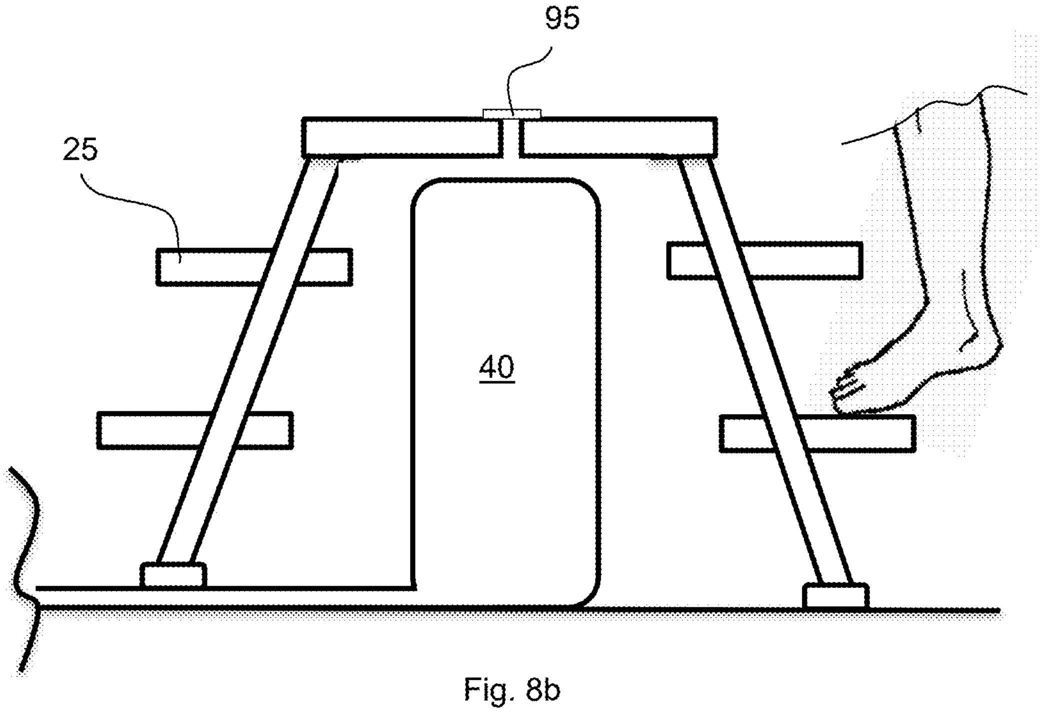
Figure 8C:
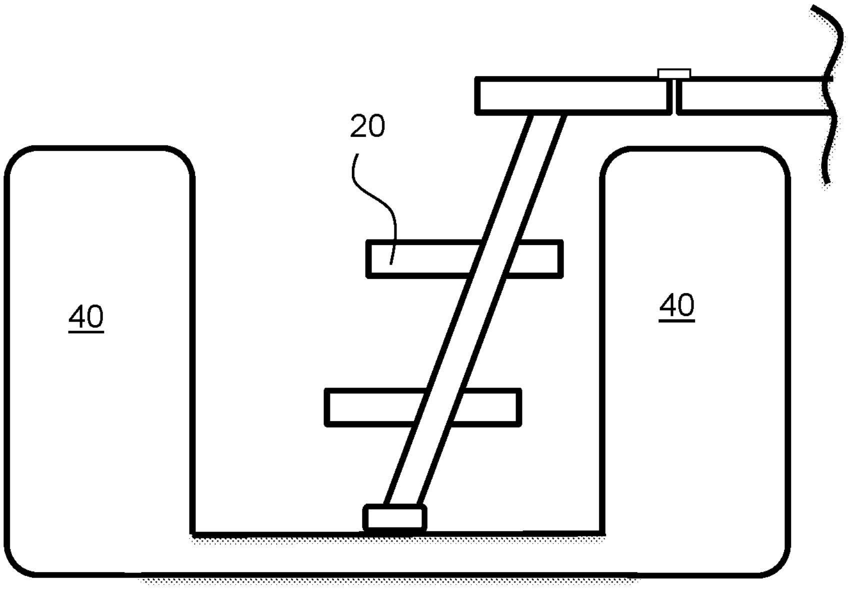
Figure 8D:
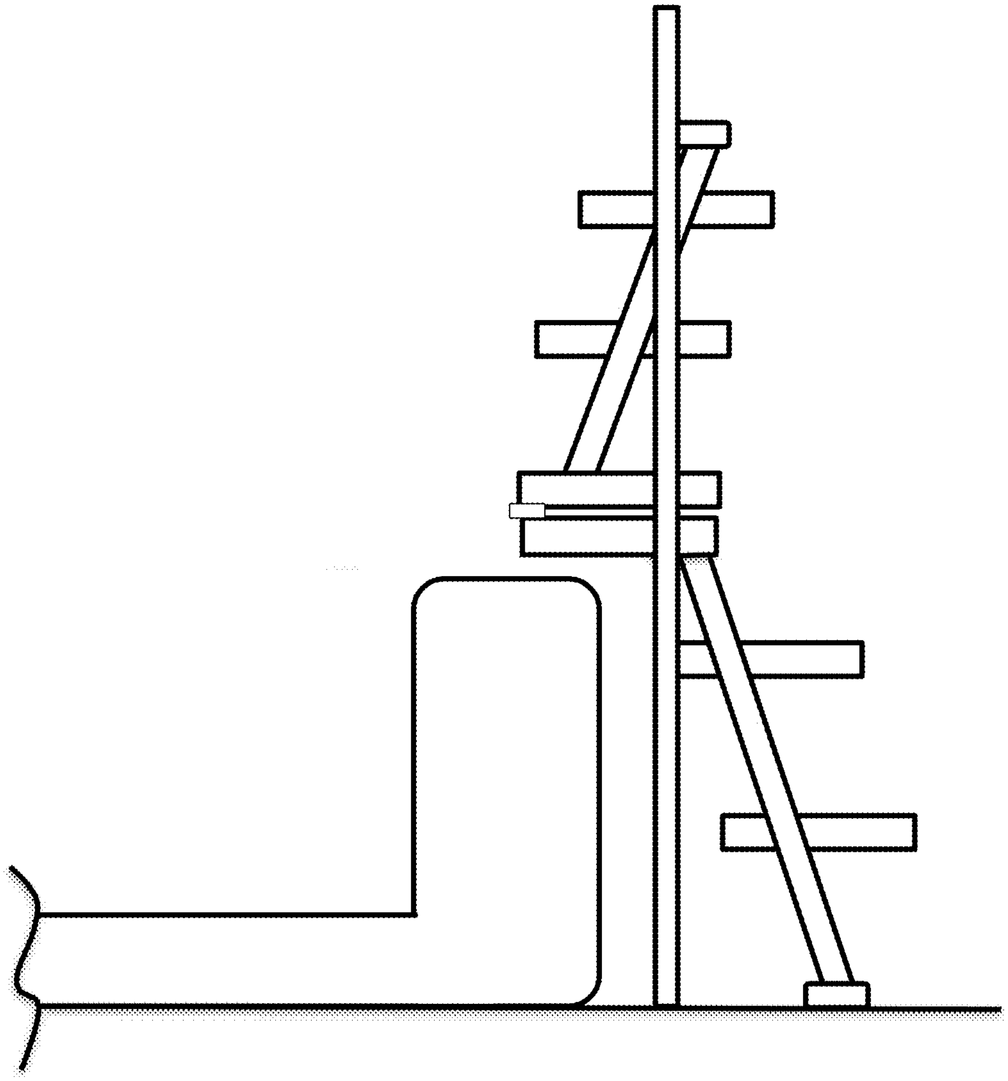

FIG. 7 is a schematic describing one method of using device 5. As shown, the user first positions device 5 in a use position, with first side 10 housed within the interior of bathtub 35, and second side 15 positioned exterior to the bathtub (e.g., on the bathroom floor). As illustrated in FIG. 8*a*, the device therefore spans the sidewall of the bathtub. The interior of the bathtub may or may not be filled with water. The user can then enter the bathtub by optionally gripping stabilizer 30 and advancing up steps 25 on second side 15 of the device, as shown in FIG. 8*b*. Once the user reaches the top step of the second side, they can then descend down the steps on first side 10 until they reach the interior of the bathtub, as shown in FIG. 8*c*. The user can then settle into the bathtub. If desired, the user can rotate first side 10 out of the bathtub interior using rotator 95. Specifically, the first end can be rotated upward and toward second end 15, such that the top steps of each side are in an abutting relationship, as shown in FIG. 8*d*. However, the rotation step is optional, and the user may choose to keep the first side in the water. When the user finishes bathing, the steps can be reversed, allowing the user to exit the bathtub. Specifically, the user can pivot the first side of the device back into the interior of the bathtub. The user can then stand up, optionally gripping stabilizer 30 as they advance up the steps of first side 10. Once they reach the top step, they can then descend the steps of second side 15 until they reach the bathroom floor. In this way, the user can traverse the sidewall of the bathtub easily and without injury.

It should be appreciated that device 5 can be used anywhere that a user desires to bathe, such as in a hospital, home, nursing home, rehabilitation center, hotel, and the like.

It is further noted that the device is not limited to use with a bathtub and can be used with any element that has a high step or sidewall, such as a shallow pool, hot tub, and the like.

Device 5 offers many advantages to the user. Specifically, the device allows a user to easily enter and leave a bathtub without having to clear the bathtub sidewall in a single step.

Accordingly, the device provides increased safety to the user, reducing the incidence of pain and/or injuries that potentially result from stepping over an elevated sidewall.

Device 5 can be easily used by a wide variety of individuals, including children, the elderly, and the disabled.

The disclosed device is designed to be lightweight, allowing users to easily pivot the first side toward and away from the second side. Further, the device can be easily moved or stored when not in use.

Users require very little work to use device 5. Some user may require no help or assistance from nurses or other aides while entering or exiting the bathtub.

The disclosed device allows easy access to existing bathtubs, saving thousands of dollars in costly remodeling expenses that otherwise may be needed.

Device 5 is considerably less expensive than existing solution, such as electronic lifts and the like.

These and other advantages would be apparent to those of ordinary skill in the art after a review of the present disclosure.

As described above, although a preferred embodiment of the present invention has been described for illustrative purposes, those skilled in the art will appreciate that various modifications, additions, and substitutions are possible, without departing from the scope and spirit of the invention as disclosed in the accompanying claims.

What is claimed is:

1. A method of entering an apparatus comprising an interior and at least one sidewall, the method comprising:

positioning a stepping device to straddle the sidewall, wherein the stepping device is defined by:

a first side and a second side, operably connected together via a rotatable element, wherein each side is defined by at least one brace operably connected to a plurality of steps including a top step at a maximum height of the device;

wherein the first side is pivotable relative to the second side, such that the top step of the first side is positioned directly adjacent to the top step of the second side in a pivoted orientation with a distance therebetween;

wherein the rotatable element is positioned on a top face of the first side top step and positioned on a top face of the second side top step and wherein the rotatable element spans the distance between the top face of the first side top step and the top face of the second side top step in a non-pivoted orientation;

wherein the rotatable element is substantially contained between the top faces of the first side top step and the second side top step, and the top faces of the first side top step and the second side top step are configured parallel to each other and facing each other in the pivoted orientation; and a stabilizer attached to the at least one brace, the stabilizer configured as a vertical arm in both the pivoted orientation and the non-pivoted orientation;

wherein the device first side is housed within the interior of the apparatus and the second side is adjacent to an exterior of the apparatus;

ascending up the steps of the second side;

descending down the steps of the first side such that the user enters the interior of the apparatus;

pivoting the first side from the interior of the apparatus via the rotatable element, such that the top step of the first side and the top step of the second side are directly adjacent to each other.

2. The method of claim 1, wherein the apparatus is a bathtub.

3. The method of claim 1, wherein the first side is configured to be positioned above the second side in the pivoted orientation.

4. The method of claim 1, further comprising gripping the stabilizer attached to at least one brace during the ascending step, descending step, or both.

5. The method of claim 1, wherein the rotatable element is a hinge.

6. The method of claim 1, wherein each brace includes a non-skid foot positioned adjacent to a support surface.

7. The method of claim 1, wherein the length of each brace is adjustable.

8. The method of claim 1, wherein the device comprises 1-5 steps.

9. The method of claim 1, wherein the device comprises a total height of about 12-50 inches.

* * * * *